United States Patent [19]
Kobayashi

[11] Patent Number: 4,718,244
[45] Date of Patent: Jan. 12, 1988

[54] AIR CONDITIONER
[75] Inventor: Shigeru Kobayashi, Zama, Japan
[73] Assignee: Nissan Motor Company, Limited, Yokohama, Japan
[21] Appl. No.: 828,359
[22] Filed: Feb. 11, 1986
[30] Foreign Application Priority Data Mar. 8, 1985 [JP] Japan .................................. 60-44656

[51] Int. Cl.⁴ .............................................. F25D 17/08
[52] U.S. Cl. ...................................... 62/176.5; 62/244; 236/44 C
[58] Field of Search ....................... 236/44 C; 98/2.11; 62/90, 176.5, 244; 165/42, 43; 261/DIG. 34

[56] References Cited

U.S. PATENT DOCUMENTS

| 1,670,656 | 5/1928 | Fleisher | 236/44 C |
| 2,063,672 | 12/1936 | Goddard | 261/DIG. 34 |
| 2,989,854 | 6/1961 | Gould | 62/244 X |
| 4,210,278 | 7/1980 | Obler | 236/44 C X |
| 4,289,195 | 9/1981 | Bellot et al. | 165/42 X |
| 4,401,013 | 8/1983 | Obashi et al. | 98/2.11 |
| 4,500,479 | 2/1985 | Fukami et al. | 98/2.11 X |
| 4,537,245 | 8/1985 | Nishimura et al. | 62/244 X |

FOREIGN PATENT DOCUMENTS 55-129111  9/1980  Japan .
59-16215  1/1984  Japan .

Primary Examiner—William E. Tapolcai
Attorney, Agent, or Firm—Schwartz, Jeffery, Schwaab, Mack, Blumenthal & Evans

[57] ABSTRACT

A first air conditioner is generally applied to a vehicle including a windshield and a passenger compartment having a front segment and a rear segment. The windshield faces the front segment of the passenger compartment. Air is injected into the front segment of the passenger compartment via a first duct. Air is injected into the rear segment of the passenger compartment via a second duct. A humidifier acts on the air injected into the rear segment of the passenger compartment via the second duct. In a second air conditioner, a humidifier can be selectively activated and deactivated. A temperature control arrangement responsive to activation and deactivation of the humidifier compensates for fluctuations in the temperature of air resulting from changes between activated and deactivated states of the humidifier.

8 Claims, 17 Drawing Figures

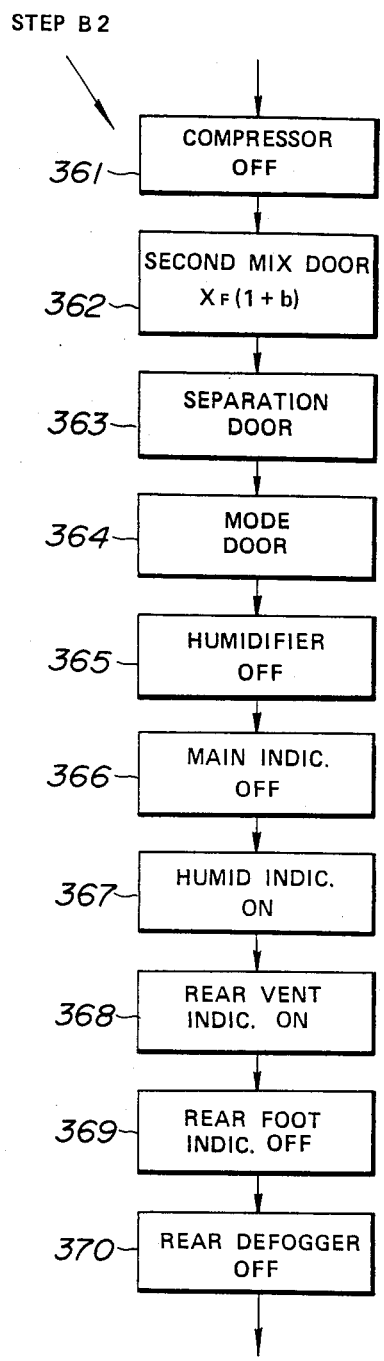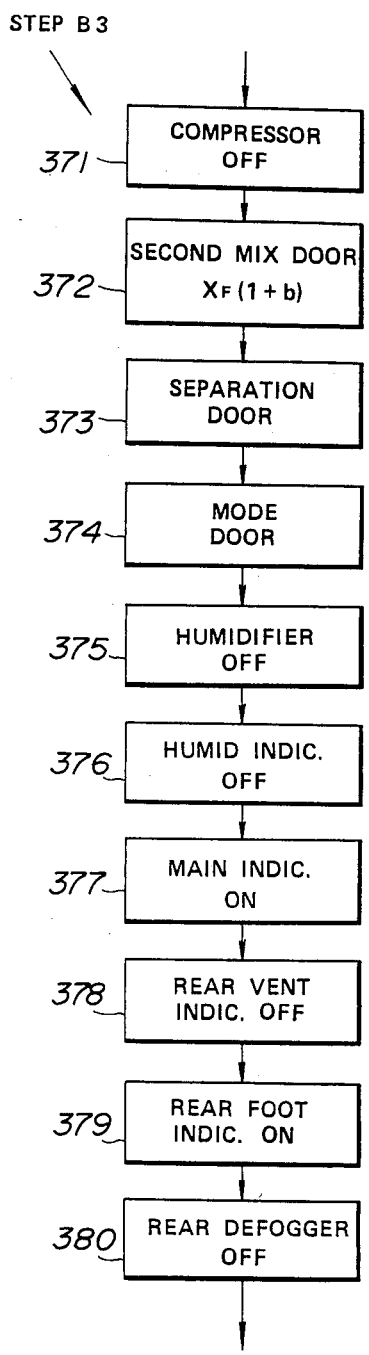

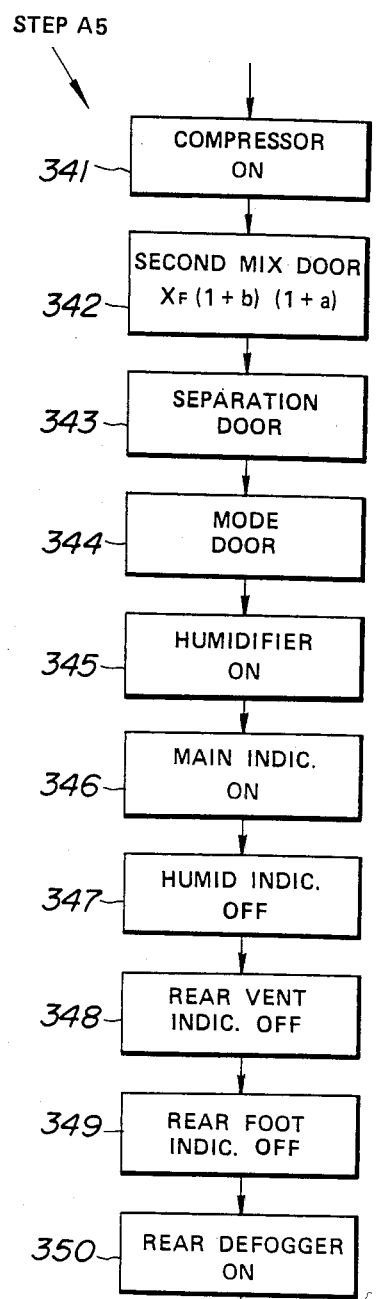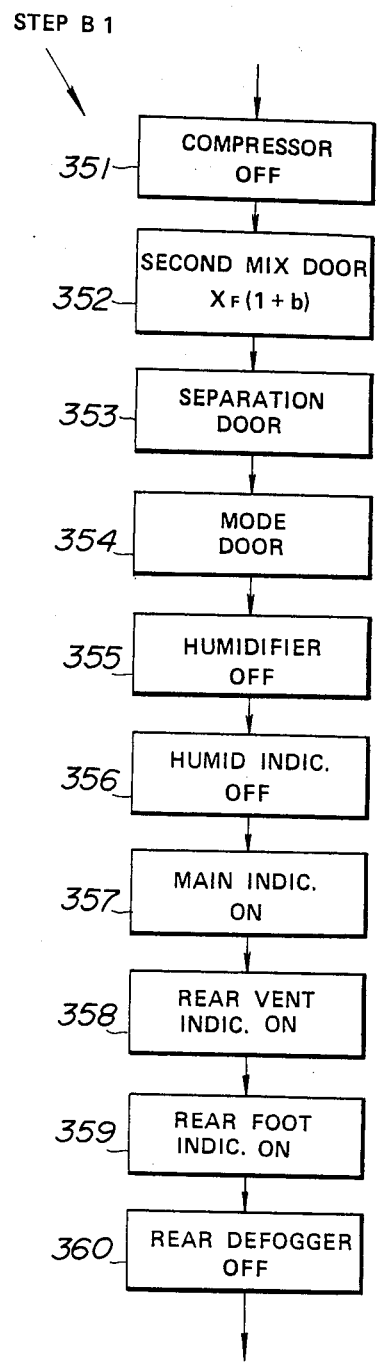

AIR CONDITIONER

BACKGROUND OF THE INVENTION

1. Field of the Invention

This invention relates to an air conditioner including a humidifier. In particular, this invention relates to a humidifier-equipped air conditioner for an automotive vehicle.

2. Description of the Prior Art

Japanese utility model publications Nos. 55-129111 and 59-16215 disclose humidifiers for automotive vehicles. These humidifiers are installed in air conditioners to adjust the humidity of air passing through ducts in the air conditioners. When the humidifier is activated, the temperature of outgoing air from the air conditioner tends to drop, since the vaporization of water requires a certain amount of heat. In addition, the humidified air is directly discharged into the front segment of the vehicle passenger compartment so that the vehicle front window is liable to fog up.

SUMMARY OF THE INVENTION

It is an object of this invention to provide a humidifier-equipped air conditioner which compensates for decreases in the outgoing air temperature when the humidifier is activated.

Another object of this invention is to provide a humidifier-equipped air conditioner for a vehicle which prevents the vehicle window from fogging up when the humidifier is activated.

A first embodiment of this invention is generally applied to a vehicle with a front window and a passenger compartment having a front segment and a rear segment. The front window defines at least part of the front segment of the passenger compartment. Air is injected into the front segment of the passenger compartment via a first arrangement. Air is injected into the rear segment of the passenger compartment via a second arrangement. A humidifier acts on the air injected into the rear segment of the passenger compartment via the second arrangement.

In a second air conditioner of this invention, a humidifier can be selectively activated and deactivated. A temperature control arrangement responsive to activation and deactivation of the humidifier compensates for fluctuations in the temperature of air resulting from changes between activated and deactivated states of the humidifier.

BRIEF DESCRIPTION OF THE DRAWINGS

FIGS. 6-15 are diagrams of the details of the air conditioning steps of FIG. 5.

DESCRIPTION OF THE PREFERRED EMBODIMENT

Figure 1:
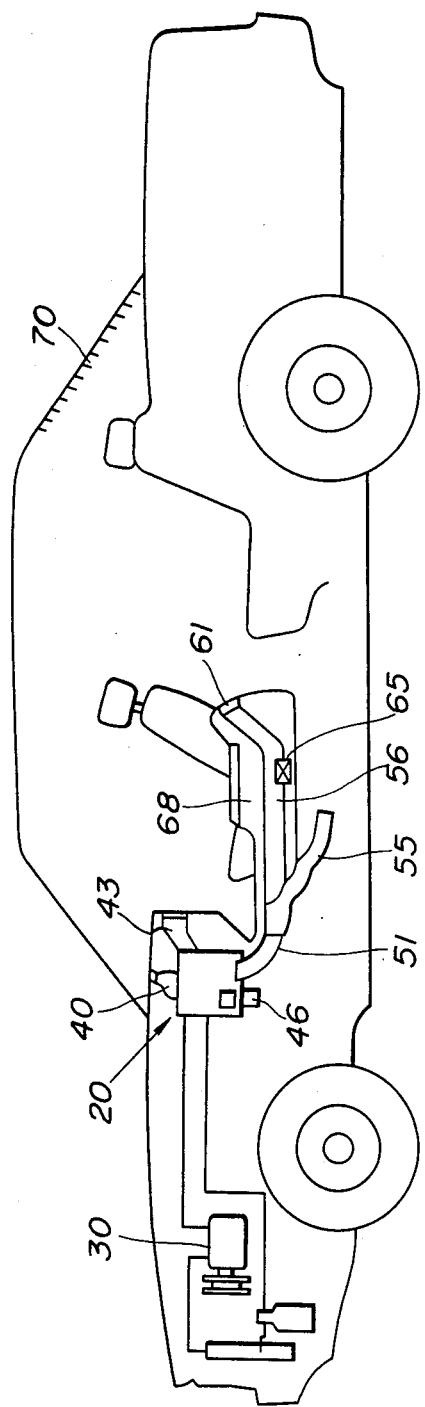
FIG. 1 is a diagrammatical section through an automotive vehicle equipped with an air conditioner of this invention.

With reference to FIG. 1, an automotive vehicle is equipped with an air conditioner of this invention which can discharge conditioned air directly into both the front segment and the rear segment of the vehicle passenger compartment.

Figure 2:
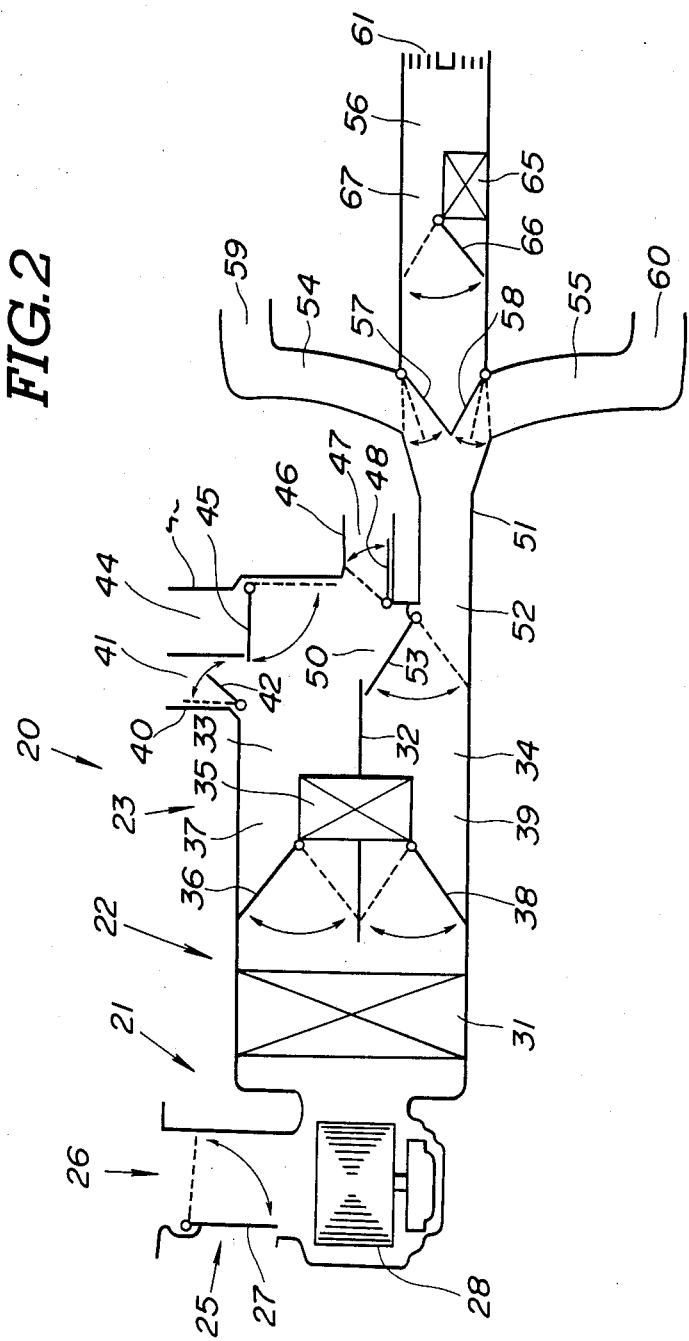
FIG. 2 is a diagram of a duct arrangement of the air conditioner of FIG. 1.

As shown in FIGS. 1 and 2, the air conditioner includes a duct arrangement 20 having a blower unit 21, a cooling unit 22, and a heating unit 23.

The blower duct 21 has two inlets 25 and 26 leading from inside and outside the vehicle respectively. A pivotable intake door 27 disposed within the duct 21 blocks and unblocks the inlets 25 and 26. A fan or blower 28 disposed within the duct 21 downstream of the intake door 27 draws in air via the inlets 25 and 26. When the intake door 27 unblocks the interior inlet 25 and blocks the exterior inlet 26, air is drawn from the interior or the passenger compartment of the vehicle into the duct 21 via the interior inlet 25. When the intake door 27 unblocks the exterior inlet 26 and blocks the interior inlet 25, air is drawn from the exterior of the vehicle into the duct 21 via the exterior inlet 26. When the intake door 27 partially unblocks both the inlets 25 and 26, air is drawn from both the interior and the exterior of the vehicle into the duct 21 via the inlets 25 and 26.

An inlet of the cooling duct 22 is connected to an outlet of the blower duct 21 so that air driven by the fan 28 moves from the blower duct 21 into the cooling duct 22. A cooling system includes a compressor 30 (see FIG. 1) and an evaporator 31 (see FIG. 2). The compressor 30 is generally coupled to a vehicular engine (not shown) via an electromagnetic clutch. The evaporator 31 is disposed within the duct 22. Air driven by the fan 28 passes through the evaporator 31. When the clutch connects the compressor 30 to the engine, the compressor 30 is activated and therefore the whole cooling system is also activated, allowing the evaporator 31 to cool the air. When the clutch disconnects the compressor 30 from the engine, the compressor 30 is deactivated and thus the whole cooling system is also deactivated so that the evaporator 31 does not affect the air temperature.

The heating duct 23 has two inlets connected to an outlet of the cooling duct 22 so that air moves from the cooling duct 22 into the heating duct 23 via these inlets. A partition wall 32 disposed within the duct 23 divides the interior of the duct 23 into first and second passages 33 and 34, each leading from one of the two inlets of the duct 23. A heating system includes a heater core or heat exchanger 35 disposed within the duct 23 and extending through the partition wall 32. A first half of the heater core 35 resides within the first passage 33. The second half of the heater core 35 resides within the second passage 34. The heater core 35 has internal passages through which vehicular engine coolant flows. As air passes through the heater core 35, it is heated by the core 35.

A first air mix door 36 disposed within the first passage 33 in the heating duct 23 can pivot between first and second limit positions. When the air mix door 36 assumes its first limit position, it blocks the front face or inlet of the first half of the heater core 35 and unblocks a segment 37 of the first passage 33 which bypasses the core 35. In this case, essentially all of the air which has entered the first passage 33 bypasses the heater core 35 and then exits from the first passage 33 so that the heater core 35 does not affect the temperature of outgoing air from the first passage 33. The first limit position is called the coolest position. When the air mix door 36 assumes its second limit position, it unblocks the front face of the first half of the heater core 35 and blocks the heater bypass segment 37 of the first passage 33. In this case, essentially all of the air which has entered the first passage 33 flows through the heater core 35 so that the heater core 35 has a maximal effect on the temperature of outgoing air from the first passage 33. The second limit position is called the warmest position. When the air mix door 36 is in a position intermediate between the two limit positions, it partially unblocks the front face of the first half of the heater core 35 and also partially unblocks the heater bypass segment 37 of the first passage 33. In this case, some of the air flows through the heater core 35 and the rest of the air bypasses the core 35 so that the core 35 has a moderate effect on the temperature of outgoing air from the first passage 33. The ratio between the rates of air flows through and bypassing the heater core 35 varies as a function of the position of the air mix door 36 so that the temperature of outgoing air from the first passage 33 depends on the position of the door 36.

A second air mix door 38 disposed within the second passage 34 in the heating duct 23 can pivot between first and second limit positions. When the air mix door 38 assumes its first limit position, it blocks the front face or inlet of the second half of the heater core 35 and unblocks a segment 39 of the second passage 34 which bypasses the core 35. In this case, essentially all of the air which has entered the second passage 34 bypasses the heater core 35 and then exits from the second passage 34 so that the heater core 35 does not affect the temperature of outgoing air from the second passage 34. The first limit position is called the coolest position. When the air mix door 38 assumes its second limit position, it unblocks the front face of the second half of the heater core 35 and blocks the heater bypass segment 39 of the second passage 34. In this case, essentially all of the air which has entered the second passage 34 flows through the heater core 35 so that the heater core 35 has a maximal effect on the temperature of outgoing air from the second passage 34. The second limit position is called the warmest position. When the air mix door 38 is in a position intermediate between the two limit positions, it partially unblocks the front face of the second half of the heater core 35 and also partially unblocks the heater bypass segment 39 of the second passage 34. In this case, some of the air flows through the heater core 35 and the rest of the air bypasses the core 35 so that the core 35 has a moderate effect on the temperature of outgoing air from the second passage 34. The ratio between the rates of air flows through and bypassing the heater core 35 varies as a function of the position of the air mix door 38 so that the temperature of outgoing air from the second passage 34 depends on the position of the door 38.

As will be described in detail hereinafter, the first passage 33 within the heating duct 23 leads to outlets designed to discharge air into the front segment of the interior or the passenger compartment of the vehicle. When air conditioning of the rear segment of the vehicle passenger compartment is required, the second passage 34 is connected to outlets designed to discharge air into the rear segment of the compartment.

A duct 40 connected to the heating unit 23 defines a defroster outlet 41 leading from a downstream end of the first passage 33 within the heating unit 23. A pivotable defroster door 42 disposed within the connection between the defroster outlet 41 and the first heating unit passage 33 blocks and unblocks the defroster outlet 41. When the defroster door 42 unblocks the defroster outlet 41, air moves from the first heating unit passage 33 to the defroster outlet 41 and then exits via the outlet 41 into the interior or the passenger compartment of the vehicle. The defroster outlet 41 generally directs outgoing air toward the vehicle front window or windshield in order to prevent it from fogging. When the defroster door 42 blocks the defroster outlet 41, air does not move from the first heating unit passage 33 to the defroster outlet 41 so that the defroster is suspended. In this way, the front defroster can be activated and deactivated via operation of the defroster door 42.

A duct 43 connected to the heating unit 23 defines a front ventilator outlet 44 leading from the downstream end of the first passage 33 within the heating unit 23. A pivotable ventilator door 45 disposed within the connection between the ventilator outlet 44 and the first heating unit passage 33 blocks and unblocks the front ventilator outlet 44. When the ventilator door 45 unblocks the front ventilator outlet 44, air moves from the first heating unit passage 33 to the front ventilator outlet 44 and then exits via the outlet 44 into the vehicle passenger compartment. The front ventilator outlet 44 generally directs outgoing air toward the breast of passengers on the vehicle front seat. When the ventilator door 45 blocks the front ventilator outlet 44, air does not move from the first heating unit passage 33 to the front ventilator outlet 44 so that the front ventilator is inactive. In this way, the front ventilator can be activated and deactivated via operation of the ventilator door 45.

A duct 46 connected to the heating unit 23 defines a front foot outlet 47 leading from the downstream end of the first passage 33 within the heating unit 23. A pivotal foot door 48 disposed within the connection between the front foot outlet 47 and the first heating unit passage 33 blocks and unblocks the front foot outlet 47. When the foot door 48 unblocks the front foot outlet 47, air moves from the first heating unit passage 33 to the front foot outlet 47 and then exits via the front foot outlet 47 into the vehicle passenger compartment. The front foot outlet 47 directs outgoing air toward the feet of passengers on the vehicle front seat. When the foot door 48 blocks the front foot outlet 47, air does not move from the first heating unit passage 33 to the front foot outlet 47. In this way, air injection from the front foot outlet 47 can be enabled and interrupted via operation of the foot door 48.

A communication opening 50 defined within the heating duct 23 connects the downstream end of the first passage 33 and a downstream end of the second passage 34. A duct 51 connected to the heating unit 23 has an inlet 52 leading from the downstream end of the second passage 34 within the heating unit 23. As will be described in detail hereinafter, the duct 51 leads to outlets designed to inject air into a rear segment of the interior or the passenger compartment of the vehicle. A pivotable separation door 53 disposed within the heating unit 23 blocks and unblocks the communication opening 50 and the inlet 52 of the duct 51. When the separation door 53 unblocks the communication opening 50 and blocks the inlet 52 of the duct 51, air moves from the second heating unit passage 34 into the outlets 41, 44, and 47 via the communication opening 50 and then enters the front segment of the interior or the passenger compartment of the vehicle. In this case, all of the air which has passed through both the first and second passages 33 and 34 within the heating unit 23 is injected into the front segment of the interior or the passenger compartment of the vehicle. When the separation door 53 blocks the communication opening 50 and unblocks the inlet 52 of the duct 51, air moves from the second heating unit passage 34 to the duct 51 and then enters the rear segment of the interior or the passenger compartment of the vehicle. In this case, air which has passed through the first heating unit passage 33 is injected into the front segment of the interior or the passenger compartment of the vehicle while air which has passed through the second heating unit passage 34 is injected into the rear segment of the interior or the passenger compartment of the vehicle.

The duct 51 trifurcates into three sub-ducts 54, 55, and 56 at a point downstream of the inlet 52. A pair of pivotable mode change doors 57 and 58 linked to each other and disposed within the duct 51 blocks and unblocks these sub-ducts 54, 55, and 56. When the mode change doors 57 and 58 unblock the first and second sub-ducts 54 and 55 but block the third sub-duct 56, air which has entered the duct 51 via the inlet 52 moves into the first and second sub-ducts 54 and 55 and then exits from the sub-ducts 54 and 55 via rear foot outlets 59 and 60 defined by the downstream ends of the sub-ducts 54 and 55 respectively. The first outlet 59 generally directs outgoing air toward the feet of passengers on the right-hand side of the vehicle rear seat. The second outlet 60 generally directs outgoing air toward the feet of passengers on the left-hand side of the vehicle rear seat. When the mode change doors 57 and 58 block the first and second sub-ducts 54 and 55 but unblock the third duct 56, air which has entered the duct 51 via the inlet 52 moves into the third sub-duct 56 and then exits from the sub-duct 56 via a rear ventilator outlet 61 defined by the downstream end of the sub-duct 56. This outlet 61 generally directs outgoing air toward the breast of passengers on the vehicle rear seat. When the mode change doors 57 and 58 partially unblock all the sub-ducts 54, 55, and 56, air moves into these sub-ducts 54, 55, and 56 and then enters the rear segment of the interior or the passenger compartment of the vehicle via the outlets 59, 60, and 61.

A humidifier 65 has an inlet and an outlet opening into the third sub-duct 56. As air passes through the humidifier 65 between its inlet and outlet, it is humidified. A pivotable humidifier control door 66 disposed within the third sub-duct 56 blocks and unblocks the inlet of the humidifier 65. When the humidifier door 66 blocks the inlet of the humidifier 65 but unblocks a passage 67 within the third sub-duct 56 which bypasses the humidifier 65, essentially all of the air which has entered the third sub-duct 56 bypasses the humidifier 65 via the bypass passage 67. In this case, the humidifier 65 does not affect the humidity of air exitting from the sub-duct 56 via the rear ventilator outlet 61. When the humidifier door 66 unblocks the inlet of the humidifier 65 but blocks the bypass passage 67, essentially all of the air which has entered the third sub-duct 56 moves into the inlet of the humidifier 65 and then flows through the humidifier 65, exiting from the humidifier 65 and returning to the sub-duct 56 via the outlet of the humidifier 65. In this case, the humidifier 65 has a maximal effect on the humidity of air exitting from the sub-duct 56 via the rear ventilator outlet 61.

The humidifier 65 may include a water atomizer having an injection nozzle designed to spray water directly into the third sub-duct 56. In this case, the door 66 is omitted. In addition, the humidifier 65 is activated and deactivated by energizing and de-energizing an electrically-powered pump driving water or a combination of water and air to the spray nozzle.

As shown in FIG. 1, the third sub-duct 56 passes through a central console box 68. The rear ventilator outlet 61 is mounted on the rear face of the console box 68. A major part of the humidifier 65 resides within the console box 68. This disposition of the humidifier 65 prevents any loss of free space within the vehicle passenger compartment.

A rear defroster or defogger 70 mainly serves to prevent the vehicle rear window from fogging.

Figure 3:
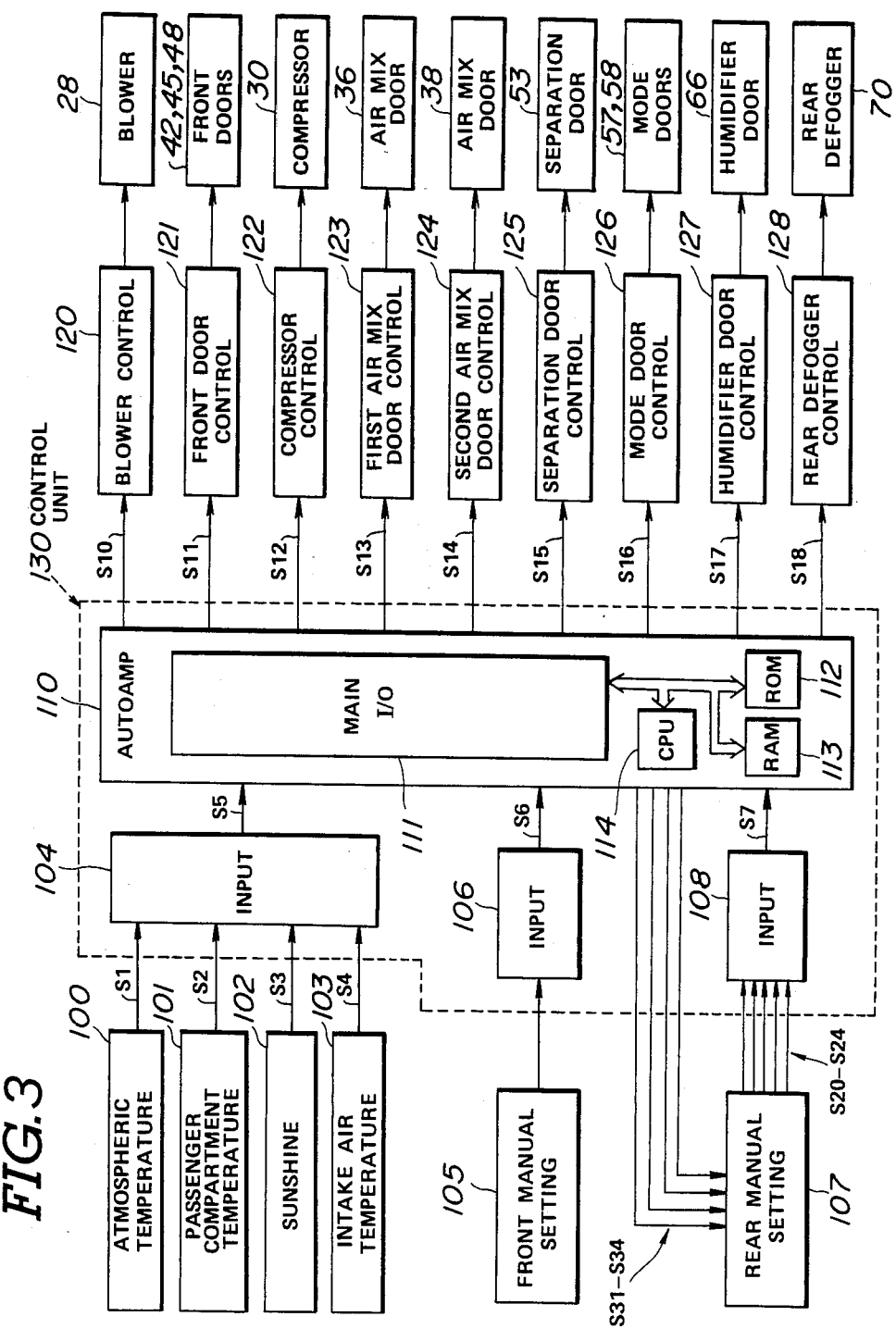
FIG. 3 is a block diagram of a control section of the air conditioner of this invention.

As shown in FIG. 3, the air conditioner includes a temperature sensor 100 generating a signal S1 representing the temperature of air outside the vehicle, that is, the atmospheric temperature.

A temperature sensor 101 generates a signal S2 representing the temperature of air within the vehicle passenger compartment.

A light sensor 102 generates a signal S3 representing the intensity of sunshine on the vehicle.

A temperature sensor 103 generates a signal S4 representing the temperature of air drawn into the blower unit 21.

A control unit 130 includes a sensor input circuit 104 receiving the signals S1–S4 and generating a multiplexed signal S5 selected from among these signals S1–S4.

A front manual setting section 105 includes switches and a potentiometer supported by a front control panel. The switches generate signals representing selected control modes of the air conditioner. The potentiometer generates a signal representing a selected target temperature of air within the front segment of the vehicle passenger compartment.

The control unit 130 includes a front setting input circuit 106 receiving the signals from the manual section 105 and generating a multiplexed signal S6 which represents the selected control mode of the air conditioner and the selected target temperature of air within the front segment of the vehicle passenger compartment.

A rear manual setting section 107 includes switches and a potentiometer supported by a rear control panel as will be described in detail hereinafter. The switches generate signals representing selected control modes of rear air conditioning. The potentiometer generates a signal representing a selected target temperature of air within the rear segment of the vehicle passenger compartment.

Figure 4:
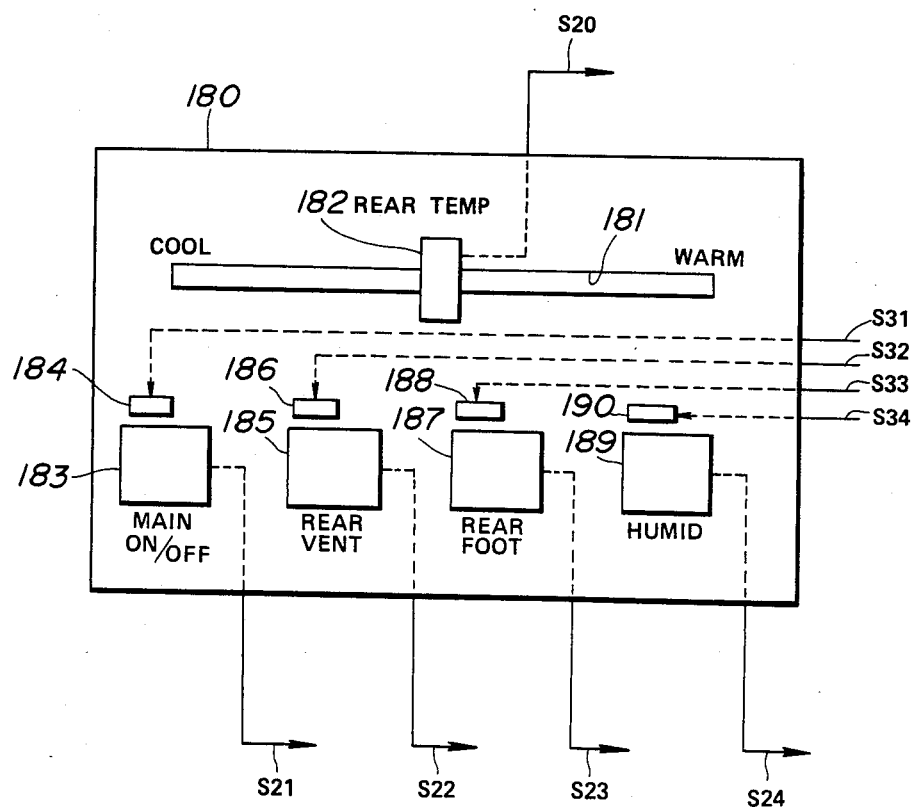
FIG. 4 is a plan view of a front control panel of the air conditioner of this invention.

FIG. 4 shows the rear control panel 180, which has a slot 181 through which a manual lever 182 slidably extends. The lever 182 is connected to an adjustment arm of the potentiometer generating the signal S20 representing the target temperature of air within the rear segment of the vehicle passenger compartment. The target temperature varies in accordance with the position of the lever 182. A manual rear air conditioning main switch 183 mounted on the control panel 180 can move between two positions, that is, between an ON position and an OFF position. The main switch 183 generates a signal S21 representing its position. When the main switch 183 assumes its ON position and OFF position, air conditioning for the rear segment of the vehicle passenger compartment is activated and interrupted respectively, as will be made clear hereinafter. An indicator 184 supported by the control panel 180 near the main switch 183 is adjusted via a control signal S31 so as to represent the position of the main switch 183. A manual rear ventilator switch 185 mounted on the control panel 180 can move between two positions, that is, between an ON position and an OFF position. The switch 185 generates a signal S22 representing its position. When the switch 185 assumes its ON position and OFF position, the rear ventilator is activated and deactivated respectively, as will be made clear hereinafter. An indicator 186 supported by the control panel 180 near the switch 185 is adjusted via a control signal S32 so as to represent the position of the switch 185. A manual rear foot-level air injection switch 187 mounted on the control panel 180 can move between two positions, that is, an ON position and an OFF position. The switch 187 generates a signal S23 representing its position. When the switch 187 assumes its ON position and OFF position, air injection toward the feet of passengers on the vehicle rear seat is enabled and interrupted respectively, as will be made clear hereinafter. An indicator 188 supported by the control panel 180 near the switch 187 is adjusted via a control signal S33 so as to represent the position of the switch 187. A manual humidifier switch 189 mounted on the control panel 180 can move between two positions, that is, between an ON position and an OFF position. The switch 189 generates a signal S24 representing its position. When the switch 189 assumes its ON position and OFF position, the humidifieer 65 (see FIGS. 1 and 2) is activated and deactivated respectively, as will be made clear hereinafter. An indicator 190 supported by the control panel 180 near the switch 189 is adjusted via a control signal S34 so as to represent the position of the switch 189.

Returning to FIG. 3, the control unit 130 includes a rear setting input circuit 108 receiving the signals S20-S24 from the potentiometer and the switchs 183, 185, 187, and 189 of the manual section 107 and deriving a multiplexed signal S7 from these signals S20-S24. The multiplexed signal S7 thus represents the selected control mode of the air conditioner and the selected target temperature of air within the rear segment of the vehicle passenger compartment.

The control unit 130 includes an auto-amp. or a main microcomputer unit 110 having the combination of a main input/output (I/O) circuit 111, a read-only memory (ROM) 112, a random-access memory (RAM) 113, and a central processing unit (CPU) 114.

The I/O circuit 111 receives the signals S5-S7 from the elements 104, 106, and 108, and outputs the control signals S31-S34 to the indicators 184, 186, 188, and 190 and also other control signals S10-S18 to adjustment circuits or drive devices 120-128 respectively. As will be made clear hereinafter, the output signals S10-S18 and S31-34 are adjusted in accordance with the input signals S1-S4 and S20-S24, and with the input signals from the front manual section 105 to the input circuit 106.

The blower control circuit 120 adjusts the voltage across or the current through a driving motor of the blower 28 in accordance with the control signal S10. Since the voltage across or the current through the driving motor determines the rotational speed of the blower 28, the adjustment of this voltage or current causes control of the rate of air flow into the blower unit 21.

The front doors control section 121 includes actuators linked to the doors 42, 45, and 48 for the control of air conditioning of the front segment of the vehicle passenger compartment. The positions of these doors 42, 45, and 48 are adjusted in accordance with the control signal S11 via the actuators.

The compressor control section 122 includes the electromagnetic clutch between the vehicular engine and the compressor 30. This clutch is engaged and disengaged in accordance with the control signal S12. Accordingly, the compressor 30 is coupled to and uncoupled from the engine in accordance with the control signal S12. It should be noted that when the compressor 30 is coupled to and uncoupled from the engine, the cooling system is activated and deactivated respectively.

The first air mix door control section 123 includes an actuator linked to the first air mix door 36. This actuator adjusts the position of the air mix door 36 in accordance with the control signal S13.

The first air mix door control section 123 may include a sensor generating a signal representing the actual position of the first air mix door 36. In this case, the position of the air mix door 36 is adjusted via the actuator in accordance with the difference between the actual position of the door 36 represented by the signal from the position sensor and the target position of the door 36 represented by the control signal S13 so that the position of the door 36 will track the target position. Such a control arrangement for adjusting an air mix door is disclosed in Japanese patent publication No. 58-218420, the contents of which are hereby incorporated by reference.

The second air mix door control section 124 includes an actuator linked to the second air mix door 38. This actuator adjusts the position of the air mix door 38 in accordance with the control signal S14.

The second air mix door control section 124 may include a sensor generating a signal representing the actual position of the second air mix door 38. In this case, the position of the air mix door 38 is adjusted via the actuator in accordance with the difference between the actual position of the door 38 represented by the signal from the position sensor and the target position of the door 38 represented by the control signal S14 so that the position of the door 38 will track the target position. Such a control arrangement for adjusting an air mix door is disclosed in Japanese patent publication No. 58-218420, the contents of which are hereby incorporated by reference.

The separation door control section 125 includes an actuator linked to the separation door 53. This actuator adjusts the position of the separation door 53 in accordance with the control signal S15.

The rear mode change doors control section 126 includes an actuator linked to the rear mode change doors 57 and 58. This actuator adjusts the positions of the rear mode change doors 57 and 58 in accordance with the control signal S16.

The humidifier door control section 127 includes an actuator linked to the humidifier door 6. This actuator adjusts the position of the humidifier door 66 in accordance with the control signal S17.

The rear defogger control circuit 127 activates and deactivates the rear defogger 70 in accordance with the control signal S18.

The operation of the control unit 130 will be described hereinafter. The control unit 130 basically adjusts the blower 28, the compressor 30, the rear defogger 70, and the doors 36, 38, 42, 45, 48, 53, 57, 58, and 66 via the control signals S10–S18 in accordance with the signals S1–S4 from the sensors 100–103, the signals from the front manual setting section 105, and the signals S20–S24 from the rear manual setting section 107. In addition, the control unit 130 activates and deactivates the indicators 184, 186, 188, and 190 via the control signals S31–S34 in accordance with the signals S21–S24 generated from the manual switches 183, 185, 187, and 189 so that the elements 184, 186, 188, and 190 can indicate the positions of the corresponding switches 183, 185, 187, and 189.

Specifically, the control unit 130 basically adjusts the position of the first air mix door 36 in accordance with the difference between the target temperature of air within the vehicle passenger compartment, derived from the signal generated by the front manual setting section 105, and the actual temperature of air within the vehicle passenger compartment, derived from the signal S2 generated by the sensor 101. This adjustment of the first air mix door 36 allows the actual air temperature to track or remain equal to the target air temperature. Also, the control unit 130 adjusts the position of the first air mix door 36 in accordance with the temperatures and the sunshine intensity derived from the signals S1, S3, and S4, and with whether or not the compressor 30 is activated.

For example, control of an air mix door which depends on the atmospheric temperature and the temperature of air within the vehicle passenger compartment is disclosed in Japanese patent publication No. 58-218420, the contents of which are hereby incorporated by reference.

The control unit 130 basically adjusts the position of the second air mix door 38 in accordance with the position of the first air mix door 36 and the target temperature of air within the rear segment of the vehicle passenger compartment derived from the signal S20. The control unit 130 corrects the position of the second air mix door 38 in accordance with whether or not the humidifier 65 is activated. When the humidifier 65 is activated, the second air mix door 38 is shifted further toward its warmest position than it would in the case where the humidifier 65 is deactivated. This correction compensates for the decrease in the air temperature due to vaporization of water by the humidifier 65.

The control unit 130 activates and deactivates the cooling comressor 30 and the rear defogger 70 in accordance with whether or not the humidifier 65 is activated. When the humidifier 65 is activated, the control unit 130 activates the cooling compressor 30 and the rear defogger 70 to prevent the vehicle windows from fogging up.

Figure 5:
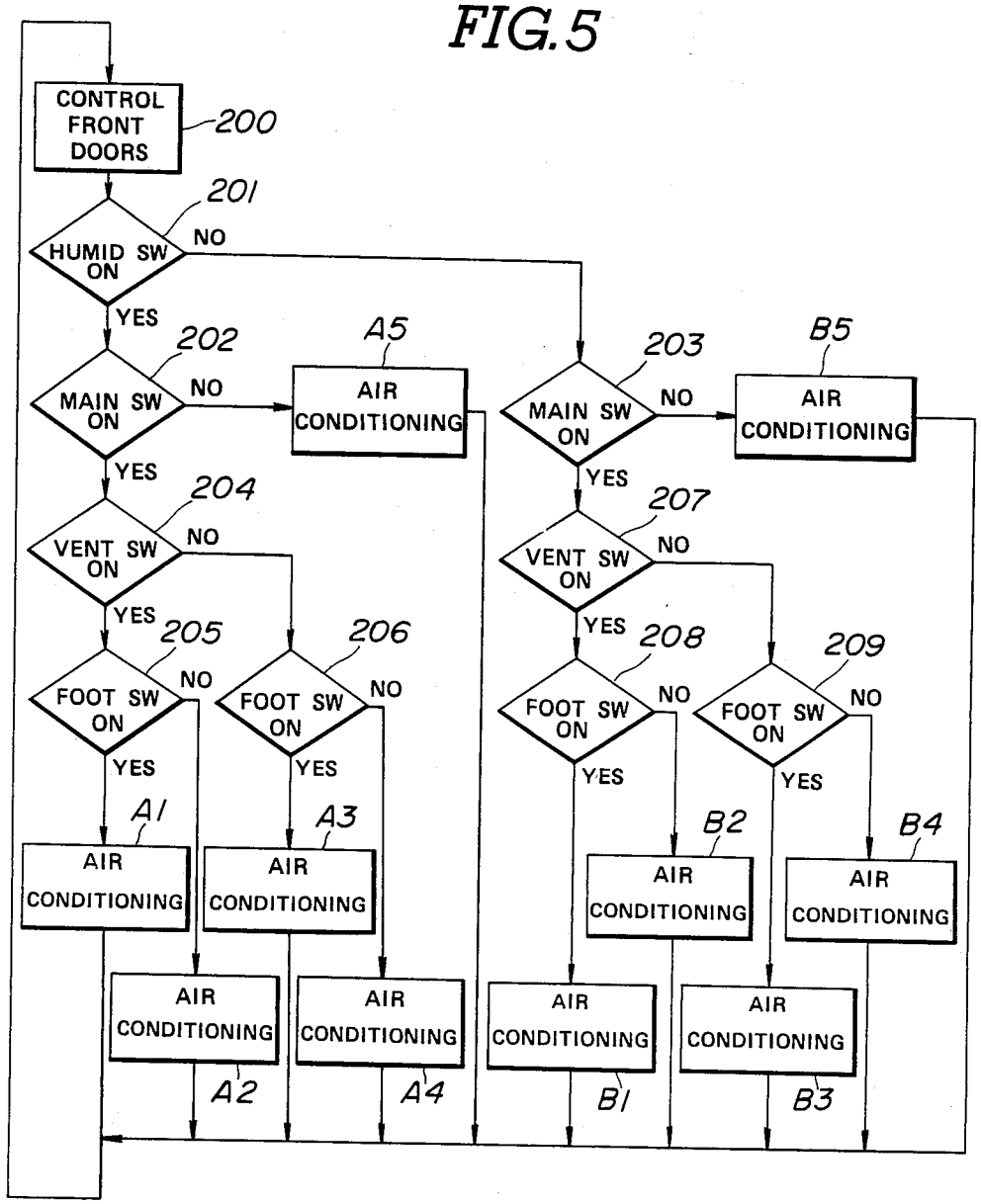
FIG. 5 is a flowchart of a program handling the control unit of FIG. 3.

The operation of the control unit 130 will be described in greater detail hereinafter. The control unit 130 operates in accordance with a program stored in the ROM 112. FIG. 5 is a flowchart of this program.

In a first step 200 of the program, the position of the first air mix door 36 is adjusted via the control signal S13 in accordance with the signals S5 and S6 which are derived from the sensor signals S1–S4 and the signals generated by the front manual setting section 105. This adjustment of the position of the first air mix door 36 is basically designed so that the temperature of air within the vehicle passenger compartment will track and remain essentially equal to the target temperature of air within the vehicle passenger compartment represented by the signal S6. In addition, the positions of the front doors 42, 45, and 48 are adjusted via the control signal S11 in accordance with the selected air conditioning more represented by the signal S6. Furthermore, the blower 28 is adjusted via the control signal S10 in accordance with the signals S5 and S6. In this way, this step 200 mainly supplies air conditioning to the front segment of the vehicle passenger compartment.

In a step 201, the position of the humidifier switch 189 is derived from the signal S24 generated by this switch 189. If the humidifier switch 189 is in its ON position, the program advances to a step 202. If the humidifier switch 189 is in its OFF position, the program advances to a step 203.

In the step 202, the position of the rear air conditioning main switch 183 is derived from the signal S21 generated by this switch 183. If the main switch 183 is in its ON position, the program advances to a step 204. If the main switch 183 is in its OFF position, the program advances to an air conditioning step A5.

In the step 204, the position of the rear ventilator switch 185 is derived from the signal S22 generated by this switch 185. If the ventilator switch 185 is in its ON position, the program advances to a step 205. If the ventilator switch 185 is in its OFF position, the program advances to a step 206.

In the step 205, the position of the rear foot-level air injection switch 187 is derived from the signal S23 generated by this switch 187. If the foot-level injection swich 187 is in its ON position, the program advances to an air conditioning step A1. If the foot-level injection switch 187 is in its OFF position, the program advances to an air conditioning step A2.

In the step 206, the position of the rear foot-level air injection switch 187 is derived from the signal S23 generated by this switch 187. If the foot-level injection switch 187 is in its ON position, the program advances to an air conditioning step A3. If the foot-level injection switch 187 is in its OFF position, the program advances to an air conditioning step A4.

In the step 203, the position of the rear air conditioning main switch 183 is derived from the signal S21 generated by this switch 183. If the main switch 183 is in its ON position, the program advances to a step 207. If the main switch 183 is in its OFF position, the program advances to an air conditioning step B5.

In the step 207, the position of the rear ventilator switch 185 is derived from the signal S22 generated by this switch 185. If the ventilator switch 185 is in its ON position, the program advances to a step 208. If the vent switch 185 is in its OFF position, the program advances to a step 209.

In the step 208, the position of the rear foot-level air injection switch 187 is derived from the signal S23 generated by this switch 187. If the foot-level injection swich 187 is in its ON position, the program advances to an air conditioning step B1. If the foot-level injection switch 187 is in its OFF position, the program advances to an air conditioning step B2.

In the step 209, the position of the rear foot-level air injection switch 187 is derived from the signal S23 generated by this switch 187. If the foot-level injection swich 187 is in its ON position, the program advances to an air conditioning step B3. If the foot-level injection switch 187 is in its OFF position, the program advances to an air conditioning step B4.

After the air conditioning steps A1-A5, and B1-B5, the program returns to the first step 200 so that the program reiterates periodically.

The air conditioning steps A1-A5, and B1-B5 will be described in detail hereinafter.

Figure 6:
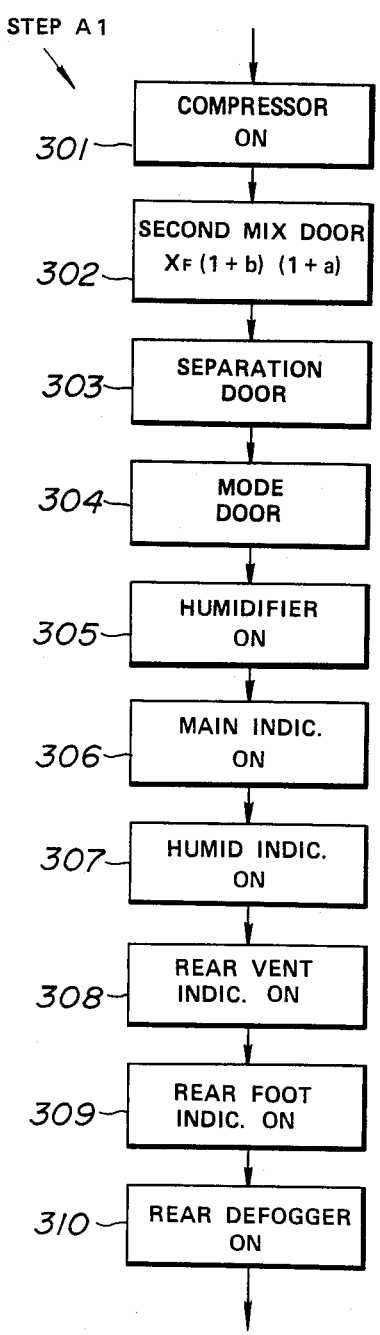

FIG. 6 shows the details of the air conditioning step A1 including a first block 301 in which the cooling compressor 30 is activated by the control signal S12. The activation of the cooling compressor 30 is to prevent the vehicle front window from fogging up when the humidifier 65 is activated.

In a block 302 following the block 301, the position of the rear temperature setting lever 182 (see FIG. 4) is derived from the signal S20. Then, the position of the second air mix door 38 is adjusted via the control signal S14 in accordance with the target position of the first air mix door 36 and with the position of the level 182.

Specifically, a basic target position of the second air mix door 38 represented by the variable XRbasic is determined by referring to the following function of the target position of the first air mix door 36 represented by the variable XF:

$$XR\text{basic} = XF(1+b)$$

where b is a value which varies linearly with the position of the rear temperature setting lever 182 (see FIG. 4).

Figure 16:
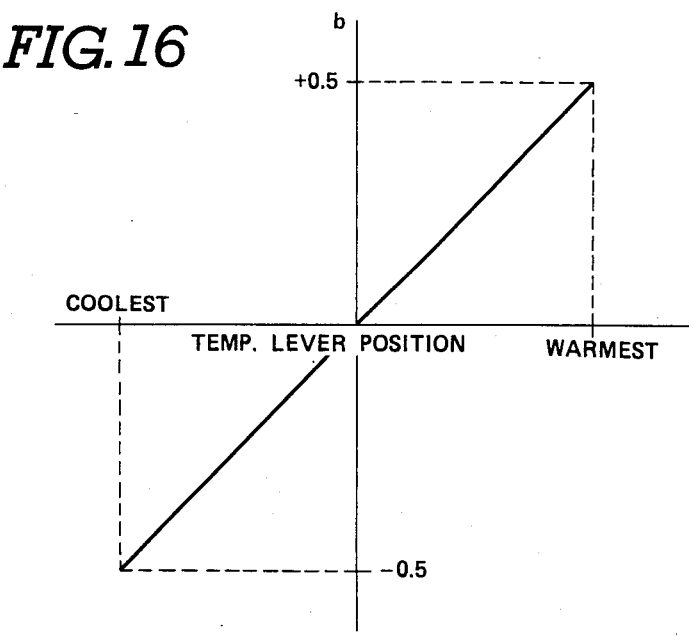
FIG. 16 is a graph of the relationship between the position of the temperature setting lever of FIG. 4 and the value of one of parameters which determine the target position of the second air mix door of FIG. 2.

As shown in FIG. 16, the value b is $+0.5$ and $-0.5$ when the rear temperature setting lever 182 is in its warmest position and in its coolest position respectively. As the lever 182 moves between the two limit positions, the value b varies linearly between $+0.5$ and $-0.5$. It should be noted that an increase in the value b causes the second air mix door 38 to move toward its warmest position.

Figure 17:
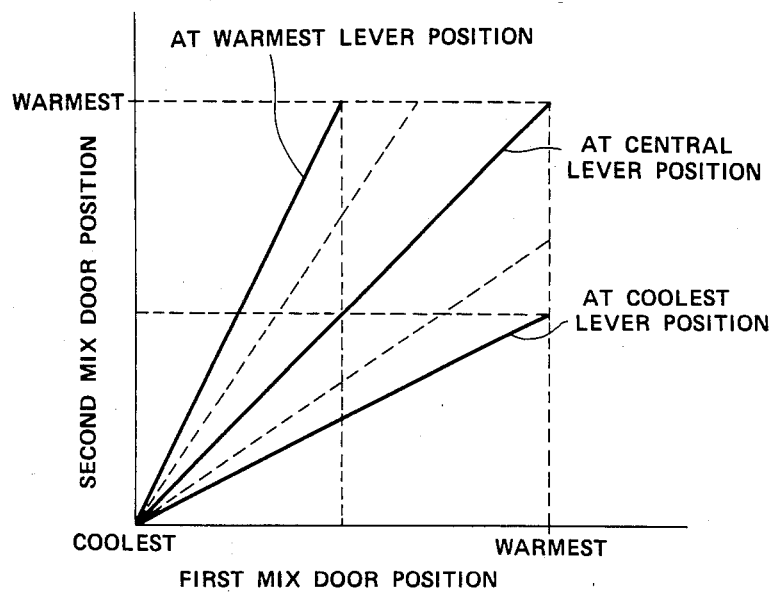
FIG. 17 is a graph of the relationship between the target positions of the first and second air mix doors of FIG. 2 at three different positions of the temperature setting lever of FIG. 4.

FIG. 17 shows the relationship between the target position of the first air mix door 36 and the basic target position of the second air mix door 38. When the rear temperature setting lever 182 is in its warmest position, the basic target position XRbasic is given by the following equation:

$$XR\text{basic} = XR(1+0.5)$$

In this case, the basic target position of the second air mix door 38 is closer to its warmest limit than the target position of the first air mix door 36 is, as shown in FIG. 17. When the lever 182 is centered between its warmest and coolest positions, the basic target position XRbasic is given by the following equation:

$$XR\text{basic} = XF$$

In this case, the basic target position of the second air mix door 38 coincides with the target position of the first air mix door 36, as shown in FIG. 17. When the lever 182 is in its coolest position, the basic target position XRbasic is given by the following equation:

$$XR\text{basic} = XF(1-0.5)$$

In this case, the basic target position of the second air mix door 38 is closer to its coolest limit than the target position of the first air mix door 36 is, as shown in FIG. 17. When the lever 182 resides at a point other than these three typical points, the basic target position XRbasic is a linear function of the position of the lever 182 which is derived from a line connecting the three typical points.

Returning to FIG. 6, a final target position of the second air mix door 38 represented by the variable XRfinal is derived from the basic target position XRbasic by referring to the following correction equation:

$$XR\text{final} = XR\text{basic}\,(1+a)$$
$$= XF(1+b)(1+a)$$

where a is a preset correction factor or constant inducing shift of the second air mix door 38 toward its warmest position in comparison with non-correction cases. This correction is to compensate for the drop in the temperature of outgoing air which would occur when the humidifier 65 is activated. It should be noted that the activation of the humidifier 65 entails vaporization of water which requires some heat.

The control signal S14 is adjusted so as to represent the final target position XRfinal. This adjustment of the control signal S14 allows the second air mix door 38 to move toward or remain at the final target position.

In a block 303 following the block 302, the control signal S15 orders the separation door 53 to be moved or held in a position in which the communication opening 50 is blocked but the inlet 52 of the rear air conditioning duct 51 is unblocked so that the rear air conditioning is enabled.

In a block 304 following the block 303, the control signal S16 orders the mode change doors 57 and 58 to be moved to or held in a position in which all the subducts 54-56 are partially unblocked so that the rear foot-lever air injection via the outlets 59 and 60 and also the rear ventilator including the outlet 61 are activated.

In a block 305 following the block 304, the control signal S17 orders the humidifier door 66 to be moved to or held in a position in which the inlet of the humidifier 65 is unblocked but the bypass passage 67 is blocked so that the humidifier 65 is activated. As was described previously, the block 301 activates the cooling system so that the vehicle front window is prevented from fogging up, even when the humidifier 65 is active. In addition, the block 302 compensates for the depressed temperature of outgoing air while the humidifier 65 is active.

In a block 306 following the block 305, the humidifier indicator 190 is activated by the control signal S34.

In a block 307 following the block 306, the rear air conditioning indicator 184 is activated by the control signal S31.

In a block 308 following the block 307, the rear ventilator indicator 186 is activated by the control signal S32.

In a block 309 following the block 308, the rear foot-level air injection indicator 188 is activated by the control signal S33.

In a final block 310 following the block 309, the rear defogger 70 is activated by the control signal S18. The activation of the rear defogger 70 prevents the vehicle rear window from fogging up even when the humidifier 65 is active.

Figure 7:
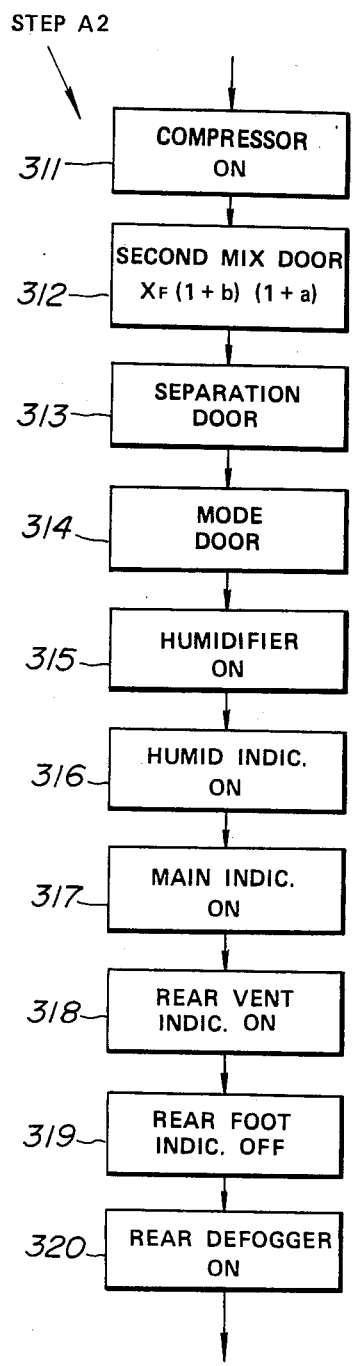

FIG. 7 shows the details of the air conditioning step A2 including a first block 311 in which the cooling compressor 30 is activated via the control signal S12.

In a block 312 following the step 301, the position of the second air mix door 38 is adjusted via the control signal S14 as in the block 302 of the air conditioning step A1.

In a block 313 following the block 312, the control signal S15 orders the separation door 53 to be moved to or held in a position in which the communication opening 50 is blocked but the inlet 52 of the rear air conditioning duct 51 is unblocked so that the rear air conditioning is enabled.

In a block 314 following the block 313, the control signal S16 orders the mode change doors 57 and 58 to be moved to or held in a position in which the sub-ducts 54 and 55 are blocked but the sub-duct 56 is unblocked so that the rear foot-level air injection is interrupted but the rear ventilation is activated.

In a block 315 following the block 314, the control signal S17 orders the humidifier door 66 to the moved to or held in a position in which the inlet of the humidifier 65 is unblocked but the bypass passage 67 is blocked so that the humidifier 65 is activated. It should be noted that as in the block 301 of the air conditioning step A1, the block 311 prevents the vehicle front window from fogging up by activating the cooling system. In addition, as in the block 302 of the air conditioning step A1, the block 312 prevents a decrease in the temperature of outgoing air by correcting the position of the second air mix door 38 toward its warmest position.

In a block 316 following the block 315, the humidifier indicator 190 is activated by the control signal S34.

In a block 317 following the block 316, the rear air conditioning indicator 184 is activated by the control signal S31.

In a block 318 following the block 317, the rear ventilator indicator 186 is activated by the control signal S32.

In a block 319 following the block 318, the rear foot-level air injection indicator 188 is deactivated by the control signal S33.

In a final block 320 following the block 319, the rear defogger 70 is activated by the control signal S18. The activation of the rear defogger 70 prevents the vehicle rear window from fogging up even when the humidifier 65 is active.

Figure 8:
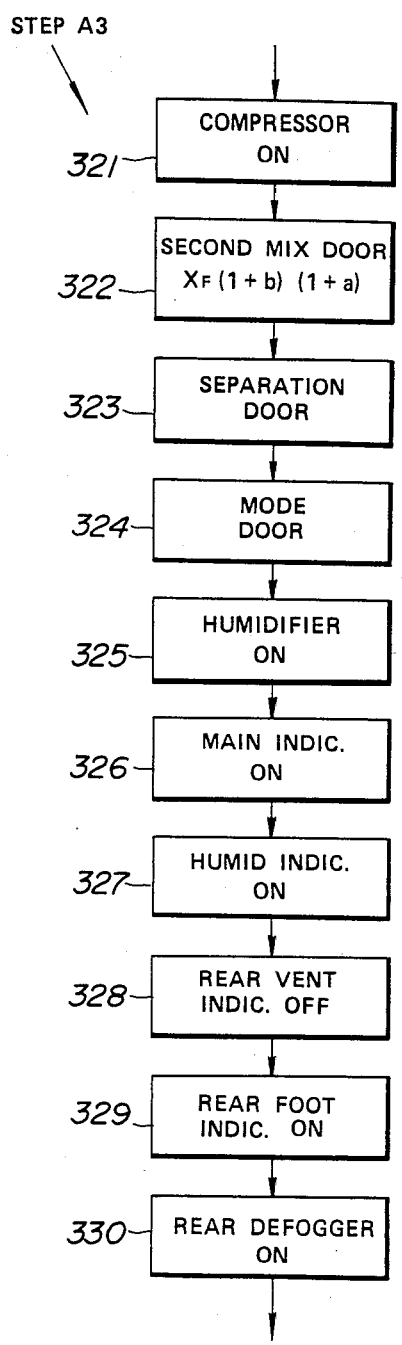

FIG. 8 shows the details of the air conditioning step A3 including a first block 321 in which the cooling compressor 30 is activated via the control signal S12.

In a block 322 following the step 321, the position of the second air mix door 38 is adjusted via the control signal S14 as in the block 302 of the air conditioning step A1.

In a block 323 following the block 322, the control signal S15 orders the separation door 53 to be moved to or held in a position in which the communication opening 50 is blocked but the inlet 52 of the rear air conditioning duct 51 is unblocked so that the rear air conditioning is enabled.

In a block 324 following the block 323, the control signal S16 orders the mode change doors 57 and 58 to be moved to or held in a position in which all the sub-ducts 54–56 are partially unblocked so that the rear foot-level air injection via the outlets 59 and 60 is enabled and also a portion of outgoing air is allowed to pass through the sub-duct 56 associated with the humidifier 65.

In a block 325 following the block 324, the control signal S17 orders the humidifier door 66 to be moved to or held in a position in which the inlet of the humidifier 65 is unblocked but the bypass passage 67 is blocked so that the humidifier 65 is activated. It should be noted that as in the block 301 of the air conditioning step A1, the block 321 prevents the vehicle front window from fogging up by activating the cooling system. In addition, as in the block 302 of the air conditioning step A1, the block 322 prevents a decrease in the temperature of outgoing air by correcting the position of the second air mix door 38 toward its warmest position.

In a block 326 following the block 325, the humidifier indicator 190 is activated by the control signal S34.

In a block 327 following the block 326, the rear air conditioning indicator 184 is activated by the control signal S31.

In a block 328 following the block 327, the rear ventilator indicator 186 is deactivated by the control signal S32.

In a block 329 following the block 328, the rear foot-level air injection indicator 188 is activated by the control signal S33.

In a final block 330 following the block 329, the rear defogger 70 is activated by the control signal S18. The activation of the rear defogger 70 prevents the vehicle rear window from fogging up even when the humidifier 65 is active.

Figure 9:
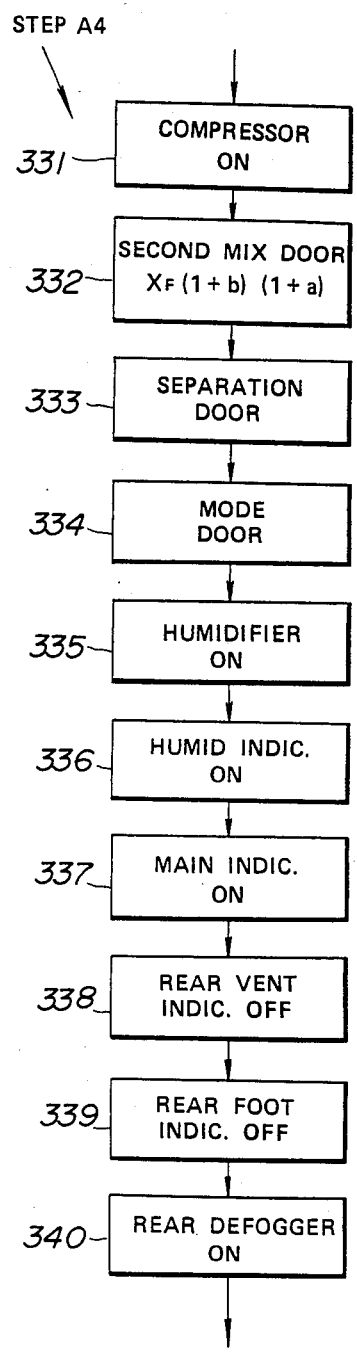

FIG. 9 shows the details of the air conditioning step A4 including a first block 331 in which the cooling compressor 30 is activated via the control signal S12.

In a block 332 following the step 331, the position of the second air mix door 38 is adjusted via the control signal S14 as in the block 302 of the air conditioning step A1.

In a block 333 following the block 332, the control signal S15 orders the separation door 53 to be moved to or held in a position in which the communication opening 50 is blocked but the inlet 52 of the rear air conditioning duct 51 is unblocked. Accordingly, provided that the mode selection doors 57 and 58 unblock the sub-duct 56, outgoing air is allowed to pass through the sub-duct 56 which is associated with the humidifier 65.

In a block 334 following the block 333, the control signal S16 orders the mode change doors 57 and 58 to be moved to or held in a position in which the sub-ducts 54 and 55 are blocked but the sub-duct 56 is unblocked so that the rear foot-level air injection is interrupted but outgoing air is allowed to pass through the sub-duct 56 which is associated with the humidifier 65.

In a block 335 following the block 334, the control signal S17 orders the humidifier door 66 to be moved to or held in a position in which the inlet of the humidifier 65 is unblocked but the bypass passage 67 is blocked so that the humidifier 65 is activated. It should be noted that as in the block 301 of the air conditioning step A1, the block 331 prevents the vehicle front window from fogging up by activating the cooling system. In addition, as in the block 302 of the air conditioning step A1, the block 332 prevents any decrease in the temperature of outgoing air by correcting the position of the second air mix door 38 toward its warmest position.

In a block 336 following the block 335, the humidifier indicator 190 is activated by the control signal S34.

In a block 337 following the block 336, the rear air conditioning indicator 184 is activated by the control signal S31.

In a block 338 following the block 337, the rear ventilator indicator 186 is deactivated by the control signal S32.

In a block 339 following the block 338, the rear foot-level air injection indicator 188 is deactivated by the control signal S33.

In a final block 340 following the block 339, the rear defogger 70 is activated by the control signal S18. The activation of the rear defogger 70 prevents the vehicle rear window from fogging up even when the humidifier 65 is active.

FIG. 10 shows the details of the air conditioning step A5 including a first block 341 in which the cooling compressor 30 is activated via the control signal S12.

In a block 342 following the step 341, the position of the second air mix door 38 is adjusted via the control signal S14 as in the block 302 of the air conditioning step A1.

In a block 343 following the block 342, the control signal S15 orders the separation door 53 to be moved to or held in a position in which the communication opening 50 is blocked but the inlet 52 of the rear air conditioning duct 51 is unblocked. Accordingly, provided that the mode selection doors 57 and 58 unblock the sub-duct 56, outgoing air is allowed to pass through the sub-duct 56 which is associated with the humidifier 65.

In a block 344 following the block 343, the control signal S16 orders the mode change doors 57 and 58 to be moved to or held in a position in which the sub-ducts 54 and 55 are blocked but the sub-duct 56 is unblocked so that the rear foot-level air injection is interrupted but outgoing air is allowed to pass through the sub-duct 56 which is associated with the humidifier 65.

In a block 345 following the block 344, the control signal S17 orders the humidifier door 66 to be moved to or held in a position in which the inlet of the humidifier 65 is unblocked but the bypass passage 67 is blocked so that the humidifier 65 is activated.

In a block 346 following the block 345, the humidifier indicator 190 is activated by the control signal S34.

In a block 347 following the block 346, the rear air conditioning indicator 184 is deactivated by the control signal S31.

In a block 348 following the block 347, the rear ventilator indicator 186 is deactivated by the control signal S32.

In a block 349 following the block 348, the rear foot-level air injection indicator 188 is deactivated by the control signal S33.

In a final block 350 following the block 349, the rear defogger 70 is activated by the control signal S18. The activation of the rear defogger 70 prevents the vehicle rear window from fogging up even when the humidifier 65 is active.

FIG. 11 shows the details of the air conditioning step B1 including a first block 351 in which the cooling compressor 30 is deactivated via the control signal S12. Since the humidifier 65 is deactivated in a later block of this air conditioning step B1, it is unnecessary to activate the cooling compressor 30 in order to prevent the vehicle front window from fogging up.

In a block 352 following the step 351, the position of the second air mix door 38 is adjusted via the control signal S14. Specifically, a basic target position of the second air mix door 38 represented by the variable XRbasic is determined on the basis of the target position of the first air mix door 36 represented by the variable XF as in the block 302 of the air conditioning step A1. Accordingly, the basic target position of the second air mix door 38 is given by the following equation:

$$XRbasic = XF(1+b)$$

where the valve b varies with the position of the rear temperature setting lever 182. Second, a final target position of the second air mix door 38 represented by the variable XRfinal is derived from the baic target position XRbasic by referring to the following equation:

$$XRfinal = XRbasic$$
$$= XF(1 + b)$$

Then, the control signal S14 is adjusted so as to represent the final target position XRfinal. This adjustment of the control signal S14 allows the second air mix door 38 to move toward or remain at the final target position. In this way, the block 352 does not perform a corrective adjustment of the second air mix door 38 toward its warmest position. It should be noted that since the humidifier 65 is deactivated in a later block of this air conditioning step B1, such a corrective adjustment of the second air mix door 38 is unnecessary.

In a block 353 following the block 352, the control signal S15 orders the separation door 53 to be moved to or held in a position in which the communication opening 50 is blocked but the inlet 52 of the rear air conditioning duct 51 is unblocked so that the rear air conditioning is enabled.

In a block 354 following the block 353, the control signal S16 orders the mode change doors 57 and 58 to be moved to or held in a position in which all the sub-ducts 54–56 are partially unblocked so that the rear foot-level air injection via the outlets 59 and 60 and also the rear ventilator including the outlet 61 are activated.

In a block 355 following the block 354, the control signal S17 orders the humidifier door 66 to be moved to or held in a position in which the inlet of the humidifier 65 is blocked but the bypass passage 67 is unblocked so that the humidifier 65 is deactivated.

In a block 356 following the block 355, the humidifier indicator 190 is deactivated by the control signal S34.

In a block 357 following the block 356, the rear air conditioning indicator 184 is activated by the control signal S31.

In a block 358 following the block 357, the rear ventilator indicator 186 is activated by the control signal S32.

In a block 359 following the block 358, the rear foot-level air injection indicator 188 is activated by the control signal S33.

In a final block 360 following the block 359, the rear defogger 70 is deactivated by the control signal S18. It should be noted that since the humidifier 65 is deactivated by the step 355, activation of the rear defogger 70 is unnecessary.

FIG. 12 shows the details of the air conditioning step B2 including a first block 361 in which the cooling compressor 30 is deactivated via the control signal S12. Since the humidifier 65 is deactivated in a later blaock of this air conditioning step B1, it is unnecessary to activate the cooling compressor 30 in order to prevent the vehicle front window from fogging up.

In a block 362 following the step 361, the position of the second air mix door 38 is adjusted via the control signal S14 as in the block 352 of the air conditioning step B1. Accordingly, the block 362 does not perform a corrective adjustment of the second air mix door 38 toward its warmest position. It should be noted that since the humidifier 65 is deactivated in a later block of this air conditioning step B2, such a corrective adjustment of the second air mix door 38 is unnecessary.

In a block 363 following the block 352, the control signal S15 orders the separation door 53 to be moved to or held in a position in which the communication opening 50 is blocked but the inlet 52 of the rear air conditioning duct 51 is unblocked so that the rear air conditioning is enabled.

In a block 364 following the block 363, the control signal S16 orders the mode change doors 57 and 58 to be moved to or held in a position in which the sub-ducts 54 and 55 are blocked but the sub-duct 56 is unblocked so that the rear foot-level air injection is interrupted but the rear ventilation is activated.

In a block 365 following the block 364, the control signal S17 orders the humidifier door 66 to be moved to or held in a position in which the inlet of the humidifier 65 is blocked but the bypass passage 67 is unblocked so that the humidifier 65 is deactivated.

In a block 366 following the block 365, the humidifier indicator 190 is deactivated by the control signal S34.

In a block 367 following the block 366, the rear air conditioning indicator 184 is activated by the control signal S31.

In a block 368 following the block 367, the rear ventilator indicator 186 is activated by the control signal S32.

In a block 369 following the block 368, the rear foot-level air injection indicator 188 is deactivated by the control signal S33.

In a final block 370 following the block 369, the rear defogger 70 is deactivated by the control signal S18. It should be noted that since the humidifier 65 is deactivated by the step 365, activation of the rear defogger 70 is unnecessary.

FIG. 13 shows the details of the air conditioning step B3 including a first block 371 in which the cooling compressor 30 is deactivated via the control signal S12. Since the humidifier 65 is deactivated in a later block of this air conditioning step B3, it is unnecessary to activate the cooling compressor 30 in order to prevent the vehicle front window from fogging up.

In a block 372 following the step 371, the position of the second air mix door 38 is adjusted via the control signal S14 as in the block 352 of the air conditioning step B1. Accordingly, the block 362 does not perform a corrective adjustment of the second air mix door 38 toward its warmest position. It should be noted that since the humidifier 65 is deactivated in a later block of this air conditioning step B3, such a corrective adjustment of the second air mix door 38 is unnecessary.

In a block 373 following the block 372, the control signal S15 orders the separation door 53 to be moved to or held in a position in which the communication opening 50 is blocked but the inlet 52 of the rear air conditioning duct 51 is unblocked so that the rear air conditioning is enabled.

In a block 374 following the block 373, the control signal S16 orders the mode change doors 57 and 58 to be moved to or held in a position in which the sub-ducts 54 and 55 are unblocked but the sub-duct 56 is blocked so that the rear foot-level air injection is enabled but the rear ventilation is deactivated.

In a block 375 following the block 374, the control signal S17 orders the humidifier door 66 to be moved to or held in a position in which the inlet of the humidifier 65 is blocked but the bypass passage 67 is unblocked.

In a block 376 following the block 375, the humidifier indicator 190 is deactivated by the control signal S34.

In a block 377 following the block 376, the rear air conditioning indicator 184 is activated by the control signal S31.

In a block 378 following the block 377, the rear ventilator indicator 186 is deactivated by the control signal S32.

In a block 379 following the block 378, the rear foot-level air injection indicator 188 is activated by the control signal S33.

In a final block 380 following the block 379, the rear defogger 70 is deactivated by the control signal S18. It should be noted that since the humidifier 65 is deactivated by the step 365, activation of the rear defogger 70 is unnecessary.

Figure 14:
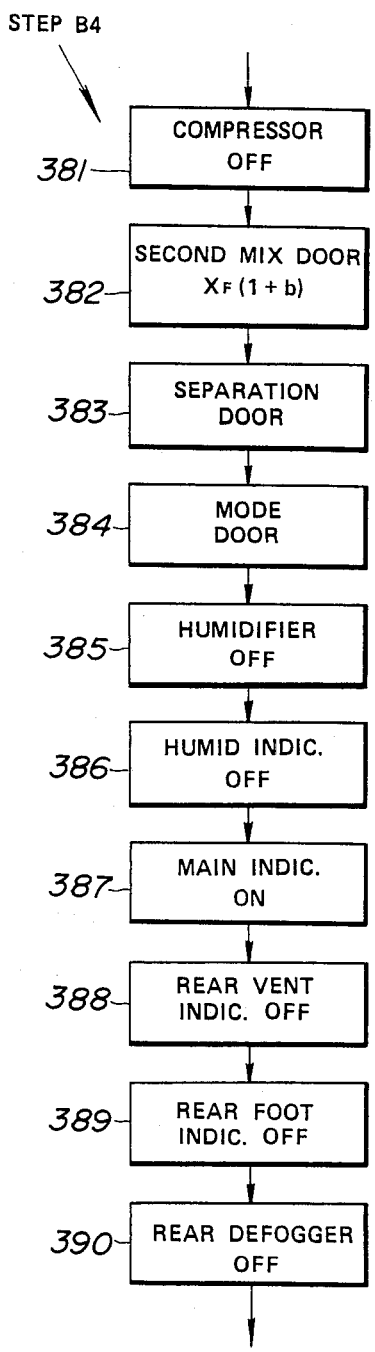

FIG. 14 shows the details of the air conditioning step B4 including a first block 381 in which the cooling compressor 30 is deactivated via the control signal S12. Since the humidifier 65 is deactivated in a later block of this air conditioning step B4, it is unnecessary to activate the cooling compressor 30 in order to prevent the vehicle front window from fogging up.

In a block 382 following the step 381, the position of the second air mix door 38 is adjusted via the control signal S14 as in the block 352 of the air conditioning step B1. Accordingly, the block 382 does not perform a corrective adjustment of the second air mix door 38 toward its warmest position. It should be noted that since the humidifier 65 is deactivated in a later block of this air conditioning step B4, such a corrective adjustment of the second air mix door 38 is unnecessary.

In a block 383 following the block 382, the control signal orders the separation door 53 to be moved to or held in a position in which the communication opening 50 is unblocked but the inlet 52 of the rear air conditioning duct 51 is blocked so that the rear air conditioning is interrupted. When the rear duct 51 is blocked, the humidifier 65 is deactivated, since essentially no air passes through the humidifier 65.

In a block 384 following the block 383, the control signal S16 orders the mode change doors 57 and 58 to be moved to or held in a position in which all the sub-ducts 54, 55, and 56 are partially unblocked.

In a block 385 following the block 384, the control signal S17 orders the humidifier door 66 to be moved to or held in a position in which the inlet of the humidifier 65 is blocked but the bypass passage 67 is unblocked.

In a block 386 following the block 385, the humidifier indicator 190 is deactivated by the control signal S34.

In a block 387 following the block 386, the rear air conditioning indicator 184 is activated by the control signal S31. The activation of this element 184 only indicates that the rear air conditioning main switch 183 is in its ON position.

In a block 388 following the block 387, the rear ventilator indicator 186 is deactivated by the control signal S32.

In a block 389 following the block 388, the rear foot-level air injection indicator 188 is deactivated by the control signal S33.

In a final block 390 following the block 389, the rear defogger 70 is deactivated by the control signal S18. It should be noted that since the humidifier 65 is deactivated, activation of the rear defogger 70 is unnecessary.

Figure 15:
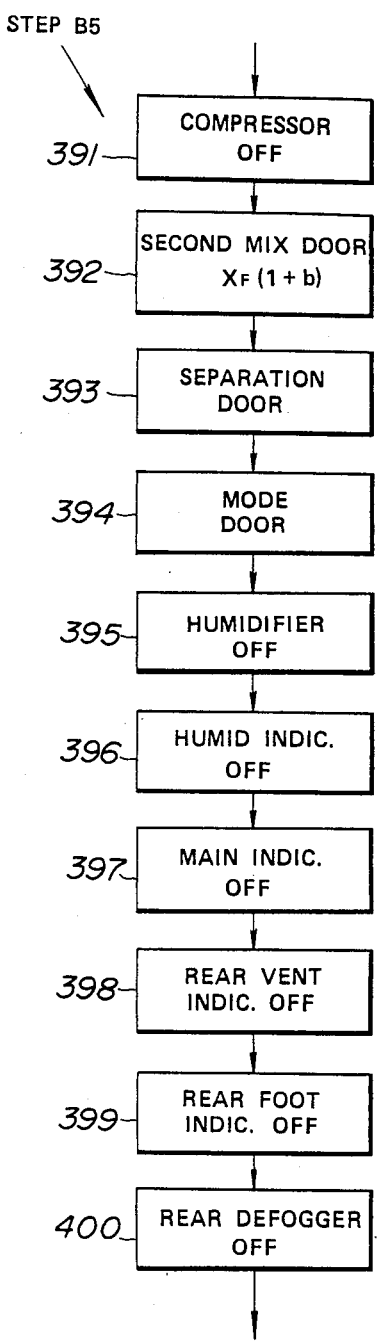

FIG. 15 shows the details of the air conditioning step B5 including a first block 391 in which the cooling compressor 30 is deactivated via the control signal S12. Since the humidifier 65 is deactivated in a later block of this air conditioning step B5, it is unnecessary to activate the cooling compressor 30 in order to prevent the vehicle front window from fogging up.

In a block 392 following the step 391, the position of the second air mix door 38 is adjusted via the control signal S14 as in the block 352 of the air conditioning step B1. Accordingly, the block 362 does not perform a corrective adjustment of the second air mix door 38 toward its warmest position. It should be noted that since the humidifier 65 is deactivated in a later block of this air conditioning step B5, such a corrective adjustment of the second air mix door 38 is unnecessary.

In a block 393 following the block 392, the control signal S15 orders the separation door 53 to be moved to or held in a position in which the communication opening 50 is unblocked but the inlet 52 of the rear air conditioning duct 51 is blocked so that the rear air conditioning is interrupted. When the rear duct 51 is blocked, the humidifier 65 is deactivated, since essentially no air passes through the humidifier 65.

In a block 394 following the block 393, the control signal S16 orders the mode change doors 57 and 58 to be moved to or held in a position in which all the subducts 54, 55, and 56 are partially unblocked.

In a block 395 following the block 394, the control signal S17 orders the humidifier door 66 to be moved to or held in a position in which the inlet of the humidifier 65 is blocked but the bypass passage 67 is unblocked.

In a block 396 followiing the block 395, the humidifier indicator 190 is deactivated by the control signal S34.

In a block 397 followiing the block 396, the rear air conditioning indicator 184 is deactivated by the control signal S31.

In a block 398 following the block 397, the rear ventilator indicator 186 is deactivated by the control signal S32.

In a block 399 following the block 398, the rear foot-level air injection indicator 188 is deactivated by the control signal S33.

In a final block 400 following the block 390, the rear defogger 70 is deactivated by the control signal S18. It should be noted that since the humidifier 65 is deactivated, activation of the rear defogger 70 is unnecessary.

What is claimed is:

1. An air conditioner for a vehicle including a front windshield and a passenger compartment having a front and a rear segment, the front windshield defining at least part of the front segment of the passenger compartment, the air conditioner comprising:
   (a) first means for providing conditioned air into the front segment of the passsenger compartment;
   (b) second means for providing conditioned air into the rear segment of the passenger compartment;
   (c) third means for humidifying the conditioned air provided into the rear segment of the passenger compartment by the second means;
   (d) fourth means for selectively activating and deactivating the third means; and
   (e) fifth means, responsive to activation and deactivation of the fourth means, for compensating for variations in the temperature of the conditioned air provided by the second means, said temperature variations resulting from changes between activation and deactivation of the third means.

2. The air conditioner of claim 1, further comprising means for adjustably determining the temperature of the air injected by the second means, the temperature determining means comprising a heat exchanger having an inlet for admitting air into the heat exchanger, means for defining a passage bypassing the inlet, a movable air mix door adjustably blocking and unblocking the inlet and the bypass passage, wherein the ratio between the rates of air flows through the inlet and bypassing the inlet depends on the position of the door, and means for adjusting the position of the door in accordance with whether or not the third means is activated.

3. The air conditioner of claim 2, wherein the position adjusting means shifts the door toward a position inducing an increase in the temperature of the air when the third means is activated.

4. The air conditioner of claim 1, further comprising a vehicle console box enclosing a major part of the third means.

5. An air conditioner for a vehicle including a front window and a passenger compartment having a front and a rear segment, the front window defining at least part of the front segment of the passenger compartment, the air conditioner comprising:
   (a) first means for injecting air into the front segment of the passenger compartment;
   (b) second means for injecting air into the rear segment of the passenger compartment; and
   (c) means for humidifying the air injected into the rear segment of the passenger compartment by the second means, wherein some of the air from said first means is injected directly onto said front window, and further comprising means for cooling the air injected by the first means when the humidifying means is activated so as to prevent said front window from fogging up.

6. An air conditioner for a vehicle including a front window and a passenger compartment having a front and a rear segment, the front window defining at least part of the front segment of the passenger compartment, the air conditioner comprising:
   (a) first means for injecting air into the front segment of the passenger compartment;
   (b) second means for injecting air into the rear segment of the passenger compartment;
   (c) means for humidifying the air injected into the rear segment of the passenger compartment by the second means; and
   (d) means for defrosting a rear window of the vehicle, the defrosting means being activated when the humidifying means is activated, the rear window defining at least part of the rear segment of the passenger compartment.

7. An air conditioner comprising:
   (a) means installed in a part of the air conditioner for humidifying air;
   (b) means for activating and deactivating said humidifying means;
   (c) means, responsive to activation and deactivation of the humidifying means, for compensating for variations in the temperature of the air resulting from changes between activation and deactivation of the humidifying means;
   (d) means for adjustably determining the temperature of the air, the temperature determining means comprising a heat exchanger having an inlet for admitting air into the heat exchanger;
(e) means for defining a passage bypassing the inlet;
(f) a movable air mix door adjustably blocking and unblocking the inlet and the bypass passage, wherein the ratio between the rates of air flowing through the inlet and bypassing the inlet depend on the position of the door; and
(g) means for adjusting the position of the door in accordance with whether or not the humidifying means is actuated.

8. The air conditioner of claim 7, wherein the position adjusting means shifts the door toward a position inducing an increase in the temperature of the air when the humidifying means is activated.

* * * * *